(12) United States Patent
Bettger et al.

(10) Patent No.: US 10,732,622 B2
(45) Date of Patent: Aug. 4, 2020

(54) ADVANCED USER INTERACTION FEATURES FOR REMOTE PARK ASSIST

(71) Applicant: Ford Global Technologies, LLC, Dearborn, MI (US)

(72) Inventors: Timothy C. Bettger, Aachen (DE); Urs Christen, Aachen (DE); Ahmed Benmimoun, Aachen (DE); Nadja Wysietzki, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 15/946,455

(22) Filed: Apr. 5, 2018

(65) Prior Publication Data

US 2019/0310624 A1 Oct. 10, 2019

(51) Int. Cl.
 *G05D 1/00* (2006.01)
 *B60W 30/06* (2006.01)
 (Continued)

(52) U.S. Cl.
 CPC .......... *G05D 1/0016* (2013.01); *B60W 30/06* (2013.01); *B60W 50/085* (2013.01);
 (Continued)

(58) Field of Classification Search
 CPC ........ B62D 15/02; B62D 15/027; B62D 1/00; B60W 10/04; B60W 30/06; B60W 10/18;
 (Continued)

(56) References Cited

U.S. PATENT DOCUMENTS

| 5,959,724 A | 9/1999 | Izumi |
| 6,275,754 B1 | 8/2001 | Shimizu |

(Continued)

FOREIGN PATENT DOCUMENTS

| CN | 101929921 A | 12/2010 |
| CN | 103818204 A | 5/2014 |

(Continued)

OTHER PUBLICATIONS

US 9,772,406 B2, 09/2017, Liu (withdrawn)
(Continued)

*Primary Examiner* — Behrang Badii
(74) *Attorney, Agent, or Firm* — Frank Lollo; Eversheds Sutherland (US) LLP

(57) ABSTRACT

Vehicle systems include features for performing remote park assist (RePA) operations. One system include a feature where a user provides a continuous input via a touchscreen on a mobile device. The mobile device transmits a message and a vehicle autonomously traverses a calculated parking path while the message is being received by the vehicle. Another system include a feature where the vehicle autonomously move to a parking space based on data received from the mobile device. The mobile device receives user inputs on a display showing representations of the vehicle and its surrounding areas to generate the data. Another system include a feature where the mobile device determines whether the user is a first time user of a RePA application. The mobile device operates in a certain training mode based on the determination.

2 Claims, 9 Drawing Sheets

(51) Int. Cl.
*B60W 50/14* (2020.01)
*B60W 50/08* (2020.01)
B60W 50/00 (2006.01)
B60T 7/12 (2006.01)
B60W 10/18 (2012.01)
B60T 7/18 (2006.01)

(52) U.S. Cl.
CPC ........... *B60W 50/14* (2013.01); *G05D 1/0088* (2013.01); *B60T 7/12* (2013.01); *B60T 7/18* (2013.01); *B60W 10/18* (2013.01); *B60W 2050/0085* (2013.01); *B60W 2050/146* (2013.01); *B60W 2554/00* (2020.02); *B60W 2720/10* (2013.01); *B60W 2720/24* (2013.01); *G05D 2201/0213* (2013.01)

(58) Field of Classification Search
CPC ............ B60W 10/20; B60W 30/18; B60W 30/18009; B60W 50/085; B60W 50/14; B60W 2254/00; B60W 2050/0085; B60W 2050/146; B60W 2720/10; B60W 2720/24; G08C 17/02; G08C 17/00; G01C 21/3476; G01C 21/3685; G01C 21/3605; G06K 9/00637; G06K 9/00812; G06K 9/4633; G05D 1/0016; G05D 1/0022; G05D 1/0038; G05D 1/0238; G05D 1/0255; G05D 1/0011; G05D 1/02; G05D 1/0088; G05D 2201/0213; G06Q 10/02; G08G 1/144; G08G 1/142; G08G 1/14; G08G 1/168; G08G 1/143; H04L 67/125; H04L 63/12; H04L 67/12

See application file for complete search history.

(56) References Cited

U.S. PATENT DOCUMENTS

| | | | |
|---|---|---|---|
| 6,356,828 B1 | 3/2002 | Shimizu | |
| 6,452,617 B1 | 9/2002 | Bates | |
| 6,476,730 B2 | 11/2002 | Kakinami | |
| 6,477,260 B1 | 11/2002 | Shimomura | |
| 6,657,555 B2 | 12/2003 | Shimizu | |
| 6,683,539 B2 | 1/2004 | Trajkovic | |
| 6,724,322 B2 | 4/2004 | Tang | |
| 6,744,364 B2 | 6/2004 | Wathen | |
| 6,768,420 B2 | 7/2004 | McCarthy | |
| 6,801,855 B1 | 10/2004 | Walters | |
| 6,850,844 B1 | 1/2005 | Walters | |
| 6,850,148 B2 | 2/2005 | Masudaya | |
| 6,927,685 B2 | 8/2005 | Wathen | |
| 6,997,048 B2 | 2/2006 | Komatsu | |
| 7,042,332 B2 | 5/2006 | Takamura | |
| 7,123,167 B2 | 10/2006 | Staniszewski | |
| 7,307,655 B1 | 12/2007 | Okamoto | |
| 7,663,508 B2 | 2/2010 | Teshima | |
| 7,737,866 B2 | 6/2010 | Wu | |
| 7,813,844 B2 | 10/2010 | Gensler | |
| 7,825,828 B2 | 11/2010 | Watanabe | |
| 7,834,778 B2 | 11/2010 | Browne | |
| 7,847,709 B2 | 12/2010 | McCall | |
| 7,850,078 B2 | 12/2010 | Christenson | |
| 7,924,483 B2 | 4/2011 | Smith | |
| 8,035,503 B2 | 10/2011 | Partin | |
| 8,054,169 B2 | 11/2011 | Bettecken | |
| 8,098,146 B2 | 1/2012 | Petrucelli | |
| 8,126,450 B2 | 2/2012 | Howarter | |
| 8,164,628 B2 | 4/2012 | Stein | |
| 8,180,524 B2 | 5/2012 | Eguchi | |
| 8,180,547 B2 | 5/2012 | Prasad | |
| 8,224,313 B2 | 7/2012 | Howarter | |
| 8,229,645 B2 | 7/2012 | Lee | |
| 8,242,884 B2 | 8/2012 | Holcomb | |
| 8,335,598 B2 | 12/2012 | Dickerhoof | |
| 8,401,235 B2 | 3/2013 | Lee | |
| 8,493,236 B2 | 7/2013 | Boehme | |
| 8,538,408 B2 | 9/2013 | Howarter | |
| 8,542,130 B2 | 9/2013 | Lavoie | |
| 8,552,856 B2 | 10/2013 | McRae | |
| 8,587,681 B2 | 11/2013 | Guidash | |
| 8,594,616 B2 | 11/2013 | Gusikhin | |
| 8,599,043 B2 | 12/2013 | Kadowaki | |
| 8,618,945 B2 | 12/2013 | Furuta | |
| 8,645,015 B2 | 2/2014 | Oetiker | |
| 8,655,551 B2 | 2/2014 | Danz | |
| 8,692,773 B2 | 4/2014 | You | |
| 8,706,350 B2 | 4/2014 | Talty | |
| 8,725,315 B2 | 5/2014 | Talty | |
| 8,742,947 B2 | 6/2014 | Nakazono | |
| 8,744,684 B2 | 6/2014 | Hong | |
| 8,780,257 B2 | 7/2014 | Gidon | |
| 8,787,868 B2 | 7/2014 | Leblanc | |
| 8,825,262 B2 | 9/2014 | Lee | |
| 8,933,778 B2 | 1/2015 | Birkel | |
| 8,957,786 B2 | 2/2015 | Stempnik | |
| 8,994,548 B2 | 3/2015 | Gaboury | |
| 8,995,914 B2 | 3/2015 | Nishidai | |
| 9,008,860 B2 | 4/2015 | Waldock | |
| 9,014,920 B1 | 4/2015 | Torres | |
| 9,078,200 B2 | 7/2015 | Wuergler | |
| 9,086,879 B2 | 7/2015 | Gautama | |
| 9,141,503 B1 | 9/2015 | Chen | |
| 9,147,065 B2 | 9/2015 | Lauer | |
| 9,154,920 B2 | 10/2015 | O'Brien | |
| 9,168,955 B2 | 10/2015 | Noh | |
| 9,193,387 B2 | 11/2015 | Auer | |
| 9,225,531 B2 | 12/2015 | Hachey | |
| 9,230,439 B2 | 1/2016 | Boulay | |
| 9,233,710 B2 | 1/2016 | Lavoie | |
| 9,273,966 B2 | 3/2016 | Bartels | |
| 9,275,208 B2 | 3/2016 | Protopapas | |
| 9,283,960 B1 | 3/2016 | Lavoie | |
| 9,286,803 B2 | 3/2016 | Tippelhofer | |
| 9,302,675 B2 | 4/2016 | Schilling | |
| 9,318,022 B2 | 4/2016 | Barth | |
| 9,379,567 B2 | 6/2016 | Kracker | |
| 9,381,859 B2 | 7/2016 | Nagata | |
| 9,429,657 B2 | 8/2016 | Sidhu | |
| 9,429,947 B1 | 8/2016 | Wengreen | |
| 9,454,251 B1 | 9/2016 | Guihot | |
| 9,469,247 B2 | 10/2016 | Juneja | |
| 9,470,540 B1 * | 10/2016 | Castellucci | G01C 21/3476 |
| 9,493,187 B2 | 11/2016 | Pilutti | |
| 9,506,774 B2 | 11/2016 | Shutko | |
| 9,511,799 B2 | 12/2016 | Lavoie | |
| 9,522,675 B1 | 12/2016 | You | |
| 9,529,519 B2 | 12/2016 | Blumenberg | |
| 9,557,741 B1 | 1/2017 | Elie | |
| 9,563,990 B2 | 2/2017 | Khan | |
| 9,595,145 B2 | 3/2017 | Avery | |
| 9,598,051 B2 | 3/2017 | Okada | |
| 9,606,241 B2 | 3/2017 | Varoglu | |
| 9,616,923 B2 | 4/2017 | Lavoie | |
| 9,637,117 B1 | 5/2017 | Gusikhin | |
| 9,651,655 B2 | 5/2017 | Feldman | |
| 9,656,690 B2 | 5/2017 | Shen | |
| 9,666,040 B2 | 5/2017 | Flaherty | |
| 9,688,306 B2 | 6/2017 | McClain | |
| 9,701,280 B2 | 7/2017 | Schussmann | |
| 9,712,977 B2 | 7/2017 | Tu | |
| 9,715,816 B1 | 7/2017 | Adler | |
| 9,725,069 B2 | 8/2017 | Krishnan | |
| 9,731,714 B2 | 8/2017 | Kiriya | |
| 9,731,764 B2 | 8/2017 | Baek | |
| 9,754,173 B2 | 9/2017 | Kim | |
| 9,809,218 B2 | 11/2017 | Elie | |
| 9,811,085 B1 | 11/2017 | Hayes | |
| 9,842,444 B2 | 12/2017 | Van Wiemeersch | |
| 9,845,070 B2 | 12/2017 | Petel | |
| 9,846,431 B2 | 12/2017 | Petel | |
| 9,914,333 B2 | 3/2018 | Shank | |
| 9,921,743 B2 | 3/2018 | Bryant | |
| 9,946,255 B2 | 4/2018 | Matters | |

(56) References Cited

U.S. PATENT DOCUMENTS

| | | |
|---|---|---|
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,131,347 B2 | 11/2018 | Kim |
| 10,192,113 B1 | 1/2019 | Liu |
| 10,246,055 B2 | 4/2019 | Farges |
| 10,268,341 B2 | 4/2019 | Kocienda |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2006/0010961 A1 | 1/2006 | Gibson |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0174574 A1 | 7/2009 | Endo |
| 2009/0241031 A1 | 9/2009 | Gamaley |
| 2009/0289813 A1 | 11/2009 | Kwiecinski |
| 2009/0309970 A1 | 12/2009 | Ishii |
| 2009/0313095 A1 | 12/2009 | Hurpin |
| 2010/0025942 A1 | 2/2010 | Mangaroo |
| 2010/0061564 A1 | 3/2010 | Clemow |
| 2010/0114471 A1 | 5/2010 | Sugiyama |
| 2010/0114488 A1 | 5/2010 | Khamharn |
| 2010/0136944 A1 | 6/2010 | Taylor |
| 2010/0152972 A1 | 6/2010 | Attard |
| 2010/0156672 A1 | 6/2010 | Yoo |
| 2010/0245277 A1 | 9/2010 | Nakao |
| 2010/0259420 A1 | 10/2010 | Von Rehyer |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1 | 5/2014 | Allexi |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1* | 8/2014 | Matters ............... B62D 15/027 |
| | | 701/2 |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1 | 3/2015 | Bonnet et al. |
| 2015/0091741 A1 | 4/2015 | Stefik |
| 2015/0104070 A1* | 4/2015 | Tabb ............... G06K 9/00637 |
| | | 382/104 |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1 | 12/2015 | Kiriya |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0152263 A1 | 6/2016 | Singh |
| 2016/0170494 A1 | 6/2016 | Bonnet et al. |
| 2016/0185389 A1 | 6/2016 | Ishijima |
| 2016/0189435 A1 | 6/2016 | Beaurepaire |

(56) References Cited

U.S. PATENT DOCUMENTS

| | | |
|---|---|---|
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1* | 12/2016 | Aich .................... B60W 30/06 |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken et al. |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0203763 A1 | 7/2017 | Yamada |
| 2017/0208438 A1 | 7/2017 | Dickow |
| 2017/0267233 A1* | 9/2017 | Minster .................. B62D 15/02 |
| 2017/0297385 A1 | 10/2017 | Kim |
| 2017/0297620 A1 | 10/2017 | Lavoie |
| 2017/0301241 A1 | 10/2017 | Urhahne |
| 2017/0308075 A1* | 10/2017 | Whitaker .............. B60W 10/04 |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo |
| 2018/0029591 A1 | 2/2018 | Lavoie |
| 2018/0029641 A1 | 2/2018 | Solar |
| 2018/0039264 A1* | 2/2018 | Messner ................ B60W 30/06 |
| 2018/0043884 A1 | 2/2018 | Johnson |
| 2018/0056939 A1 | 3/2018 | van Roermund |
| 2018/0056989 A1 | 3/2018 | Donald |
| 2018/0082588 A1 | 3/2018 | Hoffman, Jr. |
| 2018/0088330 A1 | 3/2018 | Giannuzzi |
| 2018/0093663 A1 | 4/2018 | Kim |
| 2018/0105165 A1 | 4/2018 | Alarcon |
| 2018/0105167 A1 | 4/2018 | Kim |
| 2018/0148094 A1 | 5/2018 | Mukaiyama |
| 2018/0174460 A1 | 6/2018 | Jung |
| 2018/0182183 A1* | 6/2018 | Mrowczynski ........ G08C 17/02 |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1 | 8/2018 | Min |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2019/0005445 A1 | 1/2019 | Bahrainwala |
| 2019/0042003 A1 | 2/2019 | Parazynski |
| 2019/0066503 A1 | 2/2019 | Li |
| 2019/0103027 A1 | 4/2019 | Wheeler |
| 2019/0137990 A1 | 5/2019 | Golgiri |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102009060169 A1 | 6/2013 |
| DE | 102011080148 A1 | 7/2013 |
| DE | 102012200725 A1 | 9/2013 |
| DE | 102009051055 A1 | 10/2013 |
| DE | 102010034129 B4 | 10/2013 |
| DE | 102011122421 A1 | 6/2014 |
| DE | 102012222972 A1 | 6/2014 |
| DE | 102013016342 A1 | 1/2015 |
| DE | 102013019904 A1 | 2/2015 |
| DE | 102012215218 A1 | 4/2015 |
| DE | 102012222972 A1 | 5/2015 |
| DE | 102013004214 A1 | 5/2015 |
| DE | 102013019771 A1 | 12/2015 |
| DE | 102013213064 A1 | 2/2016 |
| DE | 102014007915 A1 | 2/2016 |
| DE | 102014011802 A1 | 2/2016 |
| DE | 102014009077 A1 | 4/2016 |
| DE | 102014226458 A1 | 6/2016 |
| DE | 102015209976 A1 | 12/2016 |
| DE | 102014015655 A1 | 5/2017 |
| DE | 102014111570 A1 | 6/2017 |
| DE | 102016214433 A1 | 6/2017 |
| DE | 102015209976 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 5586450 B2 | 5/2004 |
| JP | 5918683 B2 | 10/2004 |
| JP | 2000293797 A | 7/2005 |

(56) References Cited

FOREIGN PATENT DOCUMENTS

| | | | |
|---|---|---|---|
| JP | 2004142543 A | 4/2009 |
| JP | 2016119032 A | 4/2009 |
| JP | 2018052188 A | 1/2010 |
| JP | 2004287884 A | 7/2014 |
| JP | 2005193742 A | 7/2014 |
| JP | 2009090850 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20160051993 A | 1/2010 |
| KR | 101641267 B | 9/2013 |
| KR | 20090040024 A | 4/2016 |
| KR | 20100006714 A | 5/2016 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |
| WO | WO 2010/006981 A1 | 8/2013 |
| WO | WO 2011/141096 A1 | 7/2014 |
| WO | WO 2013/056959 A1 | 5/2015 |
| WO | WO 2013/123813 A1 | 12/2015 |
| WO | WO 2014/103492 A1 | 3/2016 |
| WO | WO 2015/068032 A1 | 8/2016 |
| WO | WO 2015/193058 A1 | 9/2016 |
| WO | WO 2016/046269 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |
| WO | WO 2017/096307 A1 | 6/2017 |
| WO | WO 2017/096728 A1 | 7/2017 |
| WO | WO 2017/097942 A1 | 7/2017 |

OTHER PUBLICATIONS

Alberto Broggi and Elena Cardarelli, Vehicle Detection for Autonomous Parking Using a Soft-Cascade ADA Boost Classifier, Jun. 8, 2014.

Al-Sherbaz, Ali et al., Hybridisation of GNSS with other wireless/sensors technologies on board smartphones to offer seamless outdoors-indoors positioning for LBS applications, Apr. 2016, 3 pages.

Automatically Into the Parking Space—https://www.mercedes-benz.com/en/mercedes-benz/next/automation/automatically-into-the-parking-space/; Oct. 27, 2014.

Bill Howard, Bosch's View of the Future Car: Truly Keyless Entry, Haptic Feedback, Smart Parking, Cybersecurity, Jan. 9, 2017, 8 Pages.

ChargeItSpot Locations, Find a Phone Charging Station Near You, retrieved at https://chargeitspot.com/locations/ on Nov. 28, 2017.

Core System Requirements Specification (SyRS), Jun. 30, 2011, Research and Innovative Technology Administration.

Daimler AG, Remote Parking Pilot, Mar. 2016 (3 Pages).

Jingbin Liu, IParking: An Intelligent Indoor Location-Based Smartphone Parking Service, Oct. 31, 2012, 15 pages.

Land Rover develops a smartphone remote control for its SUVs, James Vincent, Jun. 18, 2015.

Land Rover, Land Rover Remote Control via Iphone RC Range Rover Sport Showcase—Autogefühl, Retrieved from https://www.youtube.com/watch?v=4ZaaYNaEFio (at 43 seconds and 1 minute 42 seconds), Sep. 16, 2015.

Perpendicular Parking—https://prezi.com/toqmfyxriksl/perpendicular-parking/.

SafeCharge, Secure Cell Phone Charging Stations & Lockers, retrieved at https://www.thesafecharge.com on Nov. 28, 2017.

Search Report dated Jan. 19, 2018 for GB Patent Application No. 1711988.4 (3 pages).

Search Report dated Jul. 11, 2017 for GB Patent Application No. 1700447.4 (3 Pages).

Search Report dated May 21, 2018 for Great Britain Patent Application No. GB 1800277.4 (5 Pages).

Search Report dated Nov. 22, 2018 for GB Patent Application No. GB 1809829.3 (6 pages).

Search Report dated Nov. 27, 2018 for GB Patent Application No. GB 1809112.4 (3 pages).

Search Report dated Nov. 28, 2017, for GB Patent Application No. GB 1710916.6 (4 Pages).

Search Report dated Nov. 28, 2018 for GB Patent Application No. GB 1809842.6 (5 pages).

Search Report dated Oct. 10, 2018 for GB Patent Application No. 1806499.8 (4 pages).

Tesla Model S Owner's Manual v2018.44. Oct. 29, 2018.

Vehicle's Orientation Measurement Method by Single-Camera Image Using Known-Shaped Planar Object, Nozomu Araki, Takao Sato, Yasuo Konishi and Hiroyuki Ishigaki, 2010.

\* cited by examiner

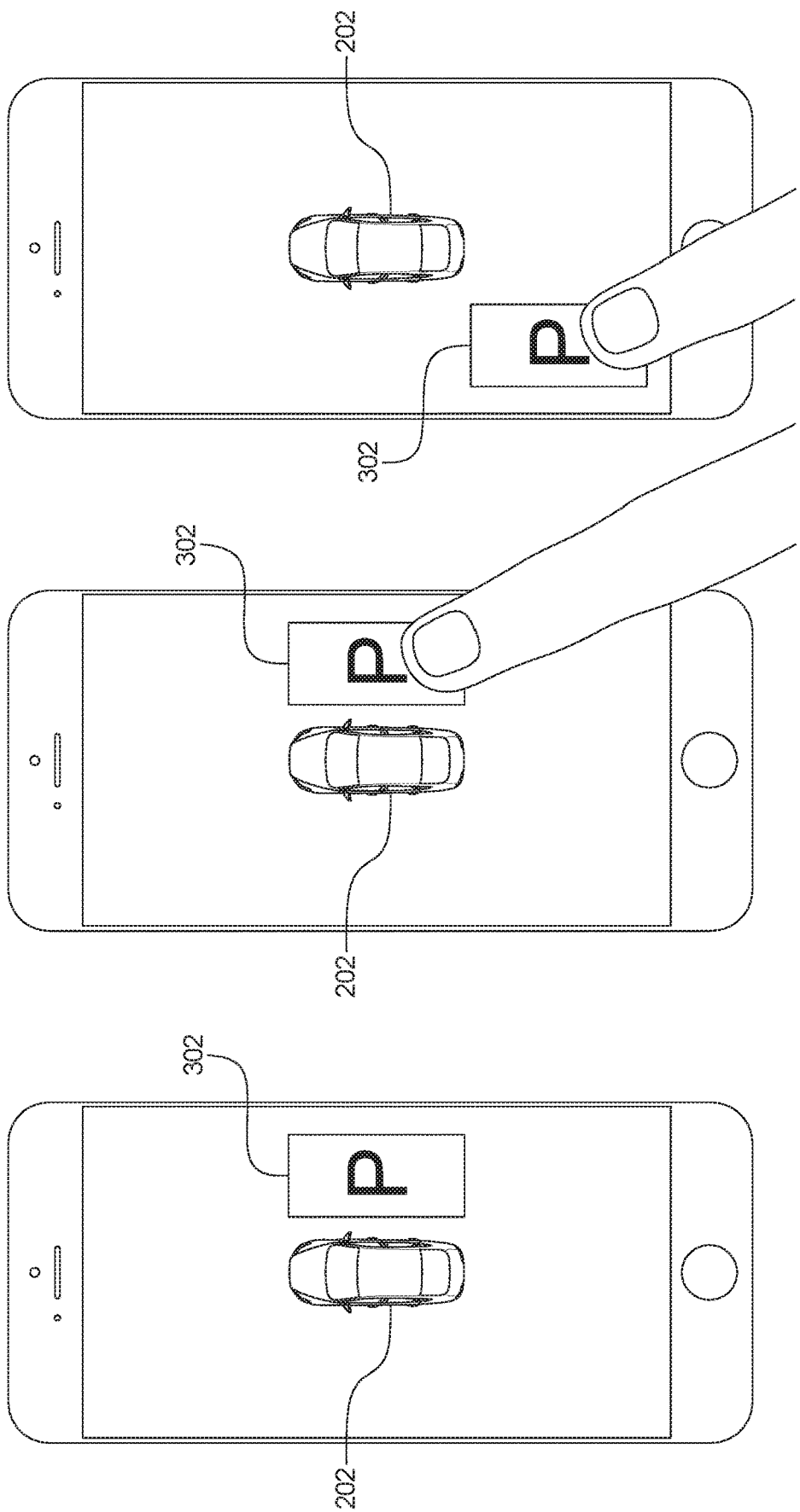

US 10,732,622 B2

ADVANCED USER INTERACTION FEATURES FOR REMOTE PARK ASSIST

TECHNICAL FIELD

The present disclosure generally relates to a vehicle system with a remote park assist park feature, and, more specifically, a vehicle and a mobile device intercommunication for performing operations related to remote park assist.

BACKGROUND

A remote parking assist (RePA) system is designed to autonomously park a vehicle. The RePA system is intended to be used when the operator is outside the vehicle. The operator triggers the RePA system to park or un-park a vehicle into or out of a parking space using a mobile device wirelessly communicating with the vehicle. Generally, in RePA systems, the mobile device communicates with the vehicle to initiate the autonomous parking maneuver. However, these RePA systems provide inadequate features for a user to intervene and manage the autonomous parking maneuver.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Systems are disclosed for remote park assist. An example vehicle system includes a mobile device including a touchscreen. The example mobile device display a track and an indicator to guide an interaction between a user input and the track. The example indicator responds to a movement of the user input along the track. The example mobile device transmits a message in response to the movement. The example vehicle autonomously traverses a calculated parking path while the message is being received.

An example vehicle system includes a vehicle to detect surrounding areas thereof. The example vehicle estimates, based on data, a parking space and boundaries of obstacles around the space. The example vehicle autonomously moves to the parking space. The example vehicle system includes a mobile device including a touch screen. The example mobile device displays representations of the vehicle and the surrounding areas, receives user inputs on a display showing the representations to generate the data, and transmits the data.

An example vehicle system includes a mobile device including a touchscreen. The example mobile device automatically operates in a first training mode when the mobile device determines that a user is a first time user of a remote park assist (RePA) application, operate in a second training mode when the mobile device determines that the user is not the first time user of the RePA application, provide a display for receiving a user input, the display comprising an indicator to guide a user for providing the input, the indicator being responsive to the first training mode and the second training mode, and transmit a message in response to the user input. The example vehicle system includes a vehicle to autonomously traverse a calculated parking path while the message is being received.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIGS. 3A, 3B, and 3C illustrate another interface on the mobile device of FIG. 1.

DETAILED DESCRIPTION OF EXAMPLE EMBODIMENTS

Figure 1:
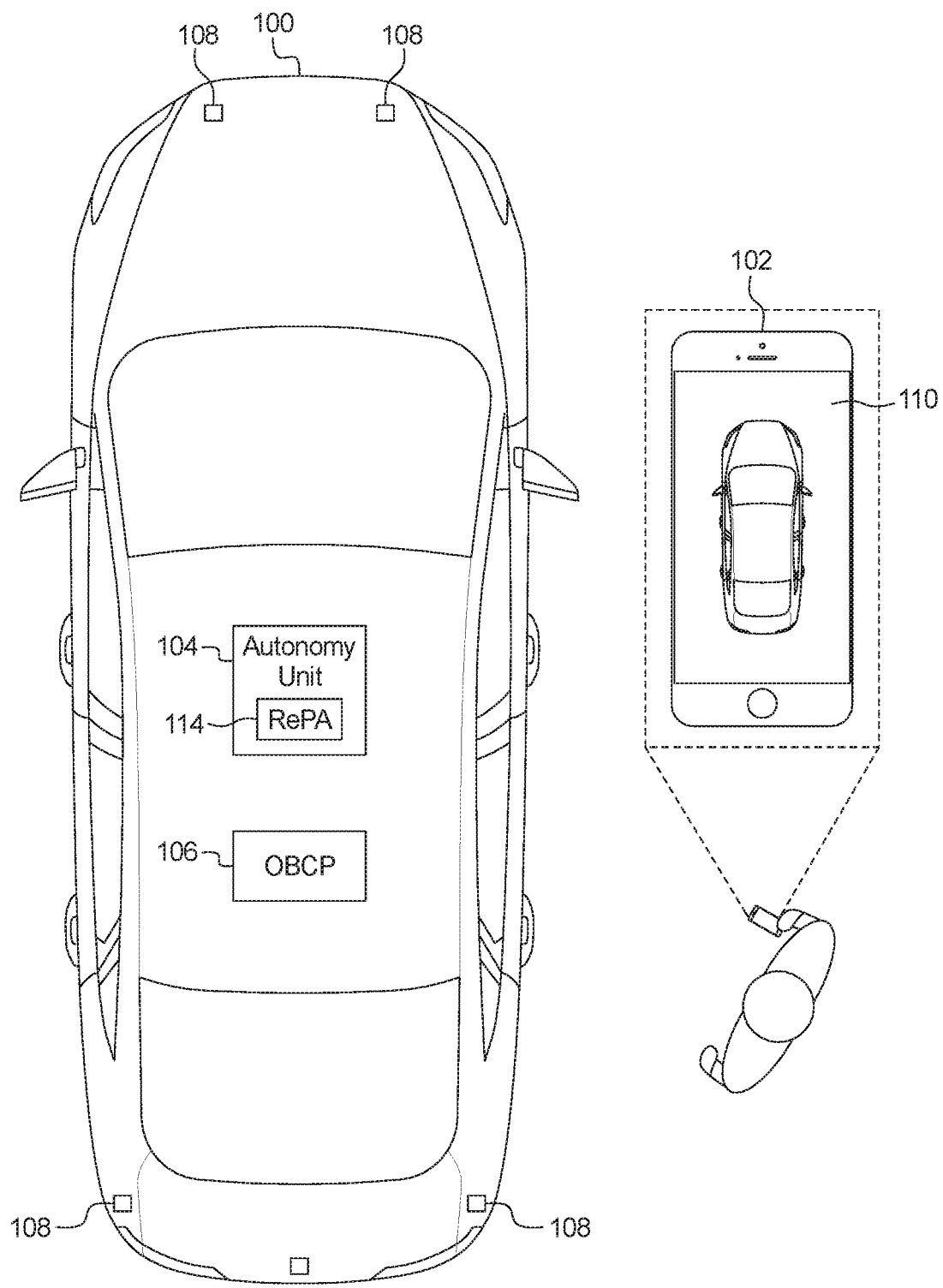
FIG. 1 illustrates a vehicle and a mobile device operating in accordance with this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Remote park assist (RePA) system is designed to autonomously park and un-park vehicles when the operator is outside the vehicle. For example, RePA system may be used when a parking spot is too narrow for the operator to open the door, or passengers to open their doors, when the vehicle is parked. RePA systems use range detection sensors (e.g., ultrasonic sensors, radar, LiDAR, cameras, etc.) to sense the environment around the vehicle and plan and execute a path into and out of the parking spot. Generally, the RePA system is activated via an application on a mobile device (e.g., smartphone, tablet, smart watch, key fob, etc.). The mobile device may include a display device, such as a touchscreen, and/or input devices to facilitate and control various RePA operations. Once the RePA system is activated, the RePA system scans an area surrounding the vehicle with the range detection sensors to detect potential parking spaces. Upon detecting a potential parking space and receiving confirmation from the user, the vehicle autonomously moves to the detected parking space. However, in many cases, the RePA system cannot detect a potential parking spot initially due to physical limitations of the range detection sensors. For example, it may be difficult for a vehicle including the range detection sensors to detect where exactly the potential parking space is located solely based on sensory information received form the range detection sensors.

As described below, the RePA system of a vehicle is paired with a mobile device to receive information regarding a potential parking space from an operator of the vehicle and estimate a location of the potential parking space based on the received information. In some examples, the RePA system detects the area surrounding the vehicle and transmits information regarding the detected area to the mobile device. The mobile device receives the information and displays virtual representations of the vehicle and the detected area surrounding the vehicle. For example, the detected area may include objects such as other vehicles, walls, pedestrians, and/or obstacles. The virtual representations of the vehicle and the surrounding area are displayed such that dimensions of the virtual representations of the vehicle and the surrounding area are scaled according to actual dimensions of the vehicle and the surrounding area. Subsequently, the operator provides an input indicative of the potential parking space based on the virtual representations. For example, the mobile may display two parked vehicles and a space between the vehicles, and the operator may select and drag the representation of the vehicle to be parked to the space between the two parked vehicles. In addition to selecting and dragging the representation of the vehicle to a desired parking space, the orientation of the vehicle can be further manipulated based on the user's preference. For example, the user may double-click the representation of the vehicle to rotate the vehicle in 180 degrees. The mobile device further transmits data regarding a user-selected parking space to the RePA system. The RePA system receives the data and prepares to initiate an autonomous parking maneuver. However, before initiating the autonomous parking maneuver, the RePA system determines whether the user-selected parking space is a valid parking space.

The RePA system determines whether a status of the user-selected parking space is valid, invalid, or unknown. A valid user-selected parking space is a space that the RePA system determines, using current measurements from the range detection sensors, has dimension in which the vehicle will fit. When the user-selected parking space is valid, the RePA system calculates a path for the vehicle to autonomously move to the user-selected parking spot. An invalid user-selected parking space is a space that the RePA system determines, using current measurements from the range detection sensors, has dimension in which the vehicle will not fit. For example, if the user-selected parking space overlaps another vehicle, the user-selected parking space is invalid. When the user-selected parking space is invalid, the RePA system causes the mobile device to display an error message and prompt the operator to input a different parking space. An unknown user-selected parking space is a space that the RePA system cannot determine, using current measurements from the range detection sensors, whether the user-selected parking space is valid or invalid. When the status of the user-selected parking space is unkown, the RePA system calculates a path to an intermediate position between the vehicle and the user-selected parking space. In some examples, the intermediate position is not a location within a direct path from the vehicle to the user-selected parking space. In such examples, the intermediate position may be a position that enables the RePA system to better detect the user-selected parking space. For example, the intermediate position may be in a location that is not a location on a path to park into the user-selected parking space; rather, the intermediate position may be a location from which line of sight(s) of the range detection sensor(s) include the user-selected parking space. The RePA system calculates a path for the vehicle to autonomously move to the intermediate position. In the intermediate position, the RePA system measures the surrounding area to determine the properties of the user-selected parking space. Subsequently, the RePA system repeats this process until the RePA system is able to determine whether the user-selected parking space is valid or invalid. .

To enable autonomous movement along a calculated path (e.g., into the parking space, to an intermediate position, etc.), the RePA system enables autonomous movement along a calculated path in response to receiving continuous input from the mobile device. Otherwise, if the continuous input is not received from the mobile device, the RePA system disables autonomous movement. As used herein, continuous input refers to receiving signals from the mobile device indicating operator engagement with the mobile device at a threshold interval to demonstrate that the operator is present and cognizant of the autonomous parking maneuvers. The RePA system performs the autonomous parking maneuver along the calculated path when the autonomous movement is enabled. To demonstrate operator engagement with the mobile device, the RePA system, via an interface on the mobile device, provides a certain interaction to be performed between the operator and the mobile device during the autonomous parking maneuver. For example, a mobile device including a touchscreen may display a circular track. While the operator maintains contact with the circular track and continuously provides a circular motion along the track, the mobile device transmits a message indicating this continuous input. In some examples, the mobile device further displays indicators in addition to the circular track to facilitate the interaction between the circular track and the operator. While the RePA features provide additional security, it may be difficult for first time users of the application to perform the interaction. Additionally, it may be desirable for experienced users of the RePA features to quickly access the application to perform the interaction.

In some examples, the mobile device provides training modes for using the RePA system based on the experience level of the user. For example, the mobile device may mandate a tutorial when the mobile device determines that the user is a first time user of the RePA system. In some examples, the mobile device provides a user-configurable default settings for experienced users of the RePA feature.

FIG. 1 illustrates a vehicle 100 and a mobile device 102 operating in accordance with this disclosure. In this illustrative example, the mobile device 102 is a smartphone. In alternative examples, the mobile device 102 may be a smart watch, a tablet, a key fob, personal digital assistant (PDA), or any other portable device that facilitated input from an operator. The mobile device 102 includes an application to facilitate operator input into RePA operations. In some examples, the mobile device 102 includes a display device and one or more input devices for providing a user interface to interact with the RePA system of the vehicle 100. In the illustrated example, the display device is a touch screen. In some examples, the input devices are hard (e.g., physical) buttons and/or soft (e.g., virtual) buttons on the touch screen. The mobile device 102 includes an application to interact with the RePA system. When the RePA system is operating, the mobile device 102 receives sensory data from the vehicle 100. The sensory data includes vehicle information and environment information. In some examples, the vehicle information include dimensions of the vehicle 100, such as length and width. The environment information includes information regarding the area around the vehicle 100 and any obstacles (e.g., other vehicle, pedestrians, walls, barriers, etc.) located within the area. Based on the vehicle information and the environment information, the mobile device 102 displays virtual representations of the vehicle 100 and the area surrounding the vehicle 100. The virtual representations of the vehicle 100 and the surrounding area are displayed such that dimensions of the virtual representations of the vehicle 100 and the surrounding area are scaled according to actual dimensions of the vehicle 100 and the surrounding area. Using the input device(s), the operator selects a desired parking space based on the virtual representations of the vehicle 100 and the surrounding area.

Figure 2C:
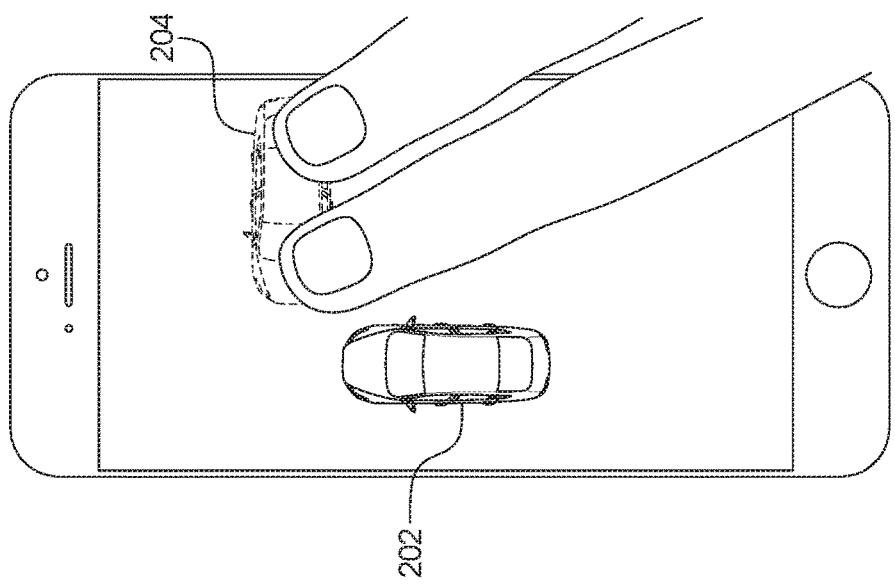
FIGS. 2A, 2B, and 2C illustrate an interface on the mobile device of FIG. 1.
Figure 2B:
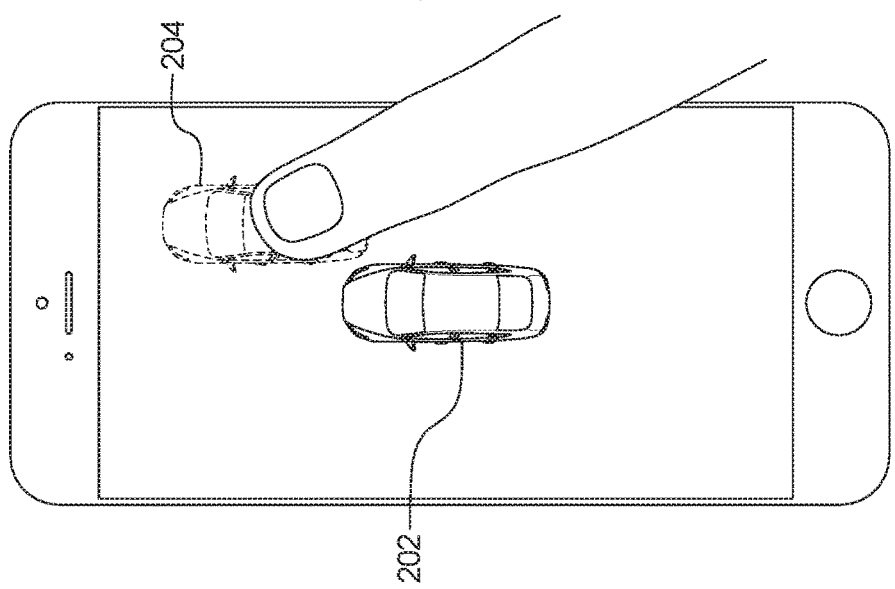
Figure 2A:
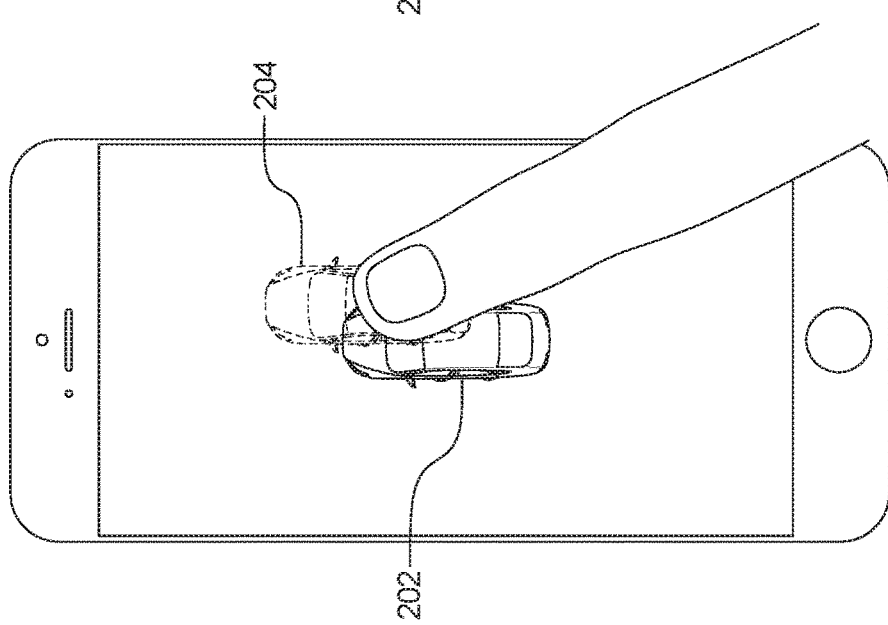

In some examples, the user provides an input via the touchscreen 110 by selecting and dragging the virtual representation of the vehicle 100 to the desired parking space. FIGS. 2A, 2B, and 2C illustrate an example interface to facilitate the operator selecting the desired parking space by manipulating a representation of the vehicle 100. In the illustrated examples of FIGS. 2A, 2B, and 2C), the display device displays a highlighted version 202 of the virtual representation of the vehicle 100 to indicate a starting position of the vehicle 100 and an outlined version 204 of the virtual representation of the vehicle 100 to indicate the desired location of the vehicle 100. Additionally, an orientation at which the vehicle 100 is parked can be manipulated by interacting with the outlined version 204. For example, the user may double-click the outlined version 204 representation of the vehicle 100 to rotate the representation of the vehicle 100 in 180 degrees. Alternatively or additionally, in some examples, the user rotates the virtual representation of the vehicle 100 by moving two of the user's fingers to provide a rotating motion on the portion of the display device. In some such examples, the display device may provide a virtual protractor to assist the user while the user rotates the virtual representation of the vehicle 100.

In some examples, a virtual parking space 302 is displayed on the display device in addition to the highlighted version 202 of the virtual representation of the vehicle 100. FIGS. 3A, 3B, and 3C illustrate an example interface to facilitate the operator selecting the desired parking space by manipulating the virtual parking space 302. The virtual parking space 302 is displayed on the display device such that: (1) the virtual parking space 302 is adjacent to the virtual representation of the vehicle 100; and (2) the virtual parking space 302 does not overlap the virtual representation of the vehicle 100. The virtual parking space 302 is representative of dimensions of a parking space in which the vehicle 100 will fit. In the illustrative examples, the highlight version 202 of the virtual representation of the vehicle 100 is not selectable, and the user selects and drags the virtual parking space 302 to the position of the desired parking space. The virtual parking space 302 facilitates the user distinguishing the starting location of the vehicle 100 from a user-selected parking location of the vehicle 100. Additionally, the orientation of the virtual parking space 302 may be manipulated by the user in the same manner as discussed with respect to the outlined version 204 of the virtual representation of the vehicle 100 in FIGS. 2A, 2B, and 2C above.

Figure 4C:
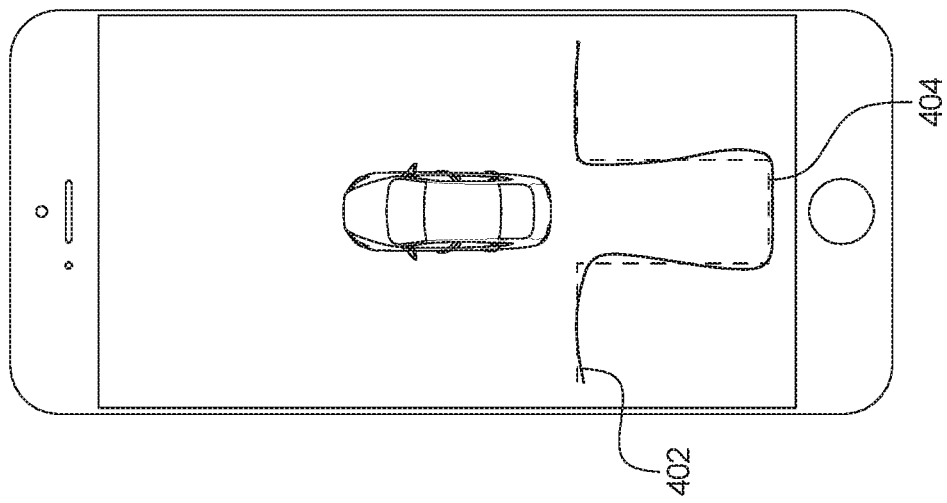
FIGS. 4A, 4B, and 4C illustrate yet another interface on the mobile device of FIG. 1.
Figure 4B:
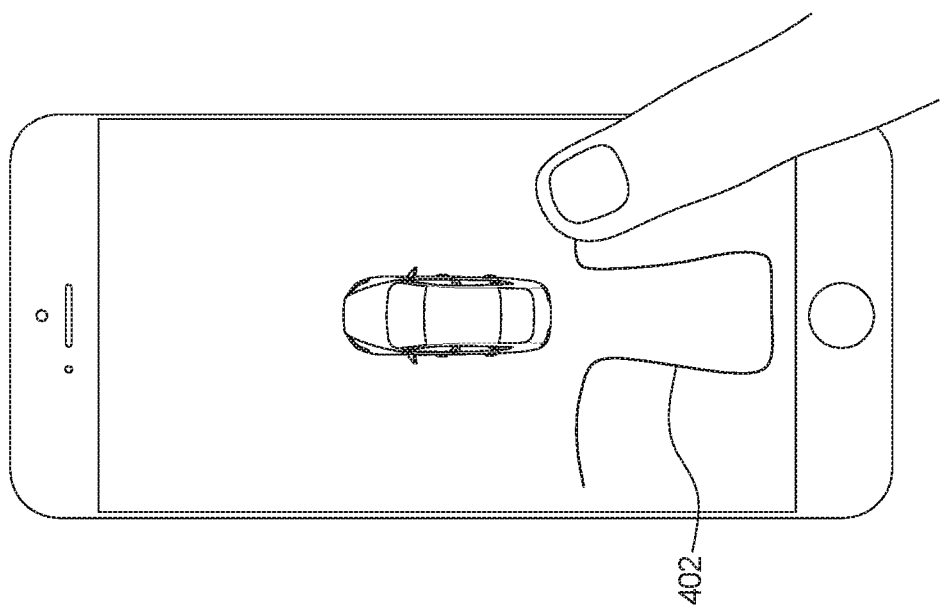
Figure 4A:
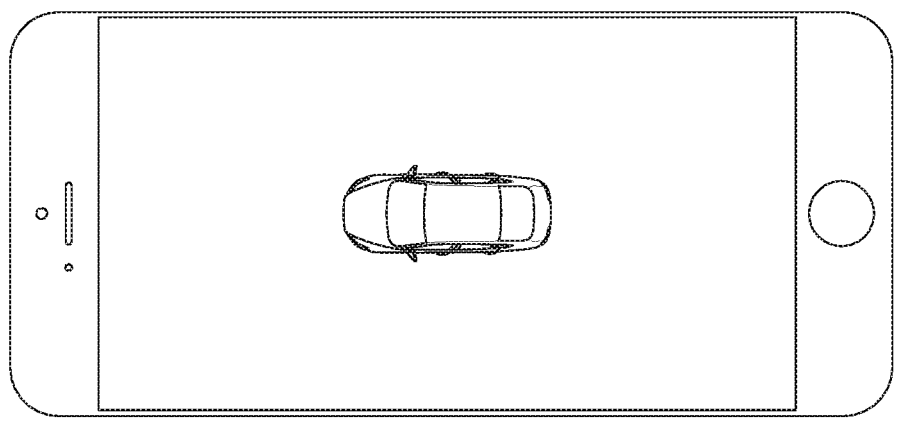

In some examples, the user sketches an outline 402 to define the desired parking space. In some examples, the interface of FIGS. 4A, 4B, and 4C is used in conjunction with the interfaces described in FIGS. 2A, 2B, and 2C and FIGS. 3A, 3B, and 3C above. Referring to FIGS. 4A, 4B, and 4C, the user inputs a sketch on the display device to provide an outline 402 defining a slot. The slot facilitates the user defining the desired parking space. For example, the user may select and drag the outlined version 204 the virtual representation of the vehicle 100 or the virtual parking space 302 into the slot in the same manner as discussed above with respect to FIGS. 2A, 2B, 2C, 3A, 3B, and 3C. Additionally, the mobile device 102 facilitates the user rotating the outline 402 based the user's input. In some examples, the outline 402 is representative of boundaries of the one or more obstacles as defined in the environment information provided from the vehicle 100. For example, in a scenario where a parking space exists between two vehicles, the user may provide a sketch outlining the boundaries of the vehicles and the parking space. Generally, a sketch provided on a touchscreen 110 is crudely drawn, and it may difficult for the user to provide the sketch accurately to define the slot. In the illustrative example, the touchscreen 110 of the mobile device 102 receives the sketch. The mobile device 102 estimates one or more straight lines based on the sketch, and generates a snap-to-grid outline 404. In such examples, the mobile device 102 uses a snap-to-grid assist to generate the snap-to-grid outline 404. The snap-to-grid assist compares a crudely shaped line to a grid and align the crudely shaped line to the nearest reference within the grid. In this illustrative example, the grid is not shown on the mobile device 102, however, in alternative examples, the grid may be shown.

Once the desired parking space and the outline 402 is provided by the user, the mobile device 102 generates user-selected parking data based on the desired parking space and the outline 402 and transmits the parking data to the vehicle 100.

Figure 5B:
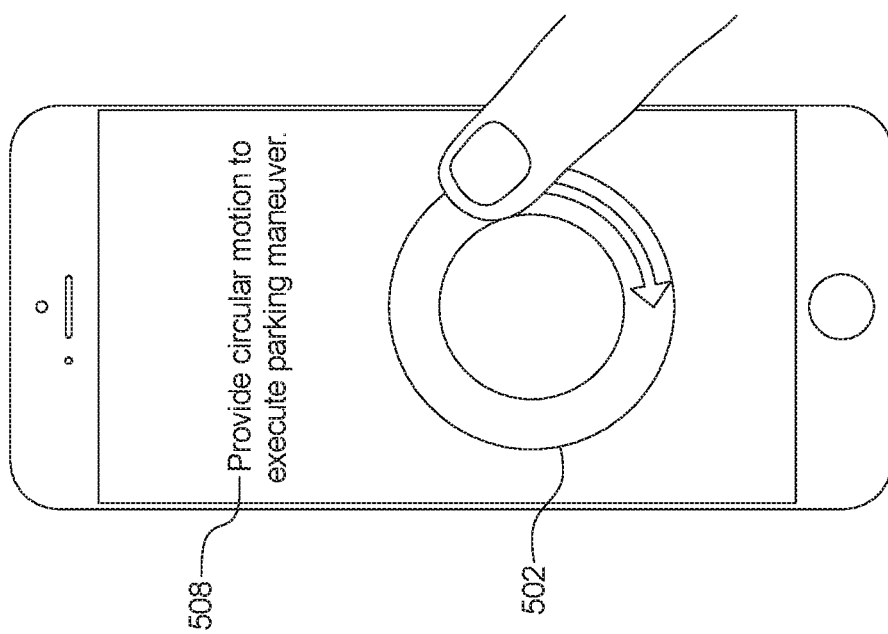
FIGS. 5A and 5B illustrates yet another interface on the mobile device of FIG. 1.
Figure 5A:
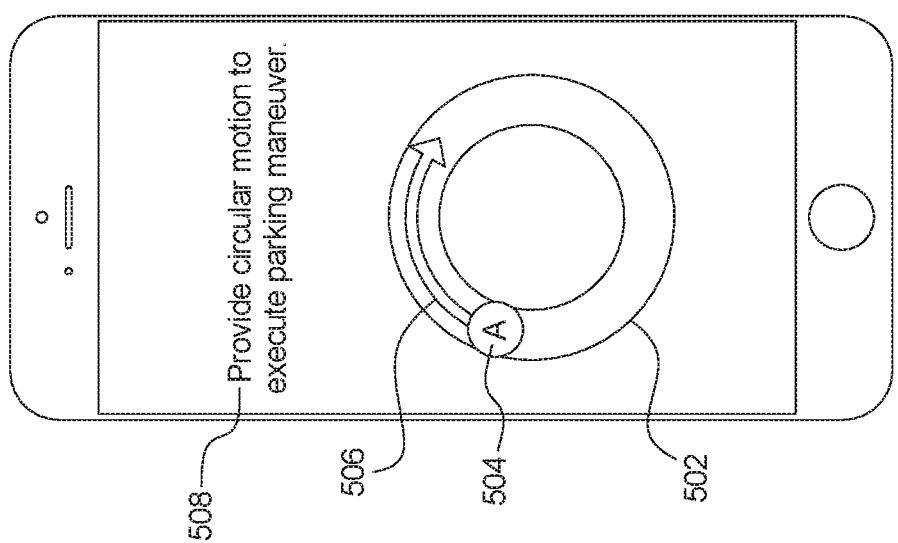

In some examples, the touchscreen 110 of the mobile device 102 displays an interface that is interactive with operations of the RePA system of the vehicle 100. In the illustrated examples of FIGS. 5A, 5B, and 5C), the touchscreen 110 of the mobile device 102 displays a user-interactive track 502. The user-interactive track 502 includes a button 504 and an indicatorarrow 506. The button 504 is interactive with the user input. When the user maintains a constant contact with the button 504 and provides a steady movement along the track 502 that satisfies a threshold speed, the mobile device 102 periodically (e.g., every 100 milliseconds, every 250 milliseconds, every 500 milliseconds, etc.) transmits an activation message to the vehicle 100. The mobile device 102 stops transmitting the messages when the user stops making contact with the button 504 or when the user fails to provide the steady movement along the track 502 at or above the threshold speed. As such, the mobile device 102 ensures that the activation message is transmitted to the vehicle 100 only when the user is actively interacting with the mobile device 102 to demonstrate the user is in possession of the mobile device 102 and that the user is aware of the vehicle 100 during operation of the RePA system.

In this illustrative example, the user-interactive track 502 is a circular track 502. In alternative examples, the shape of the user-interactive track 502 may be in any other form. The arrow 506 is connected to the button 504 and is formed within the track 502 to indicate a direction to which the user should be moving the button 504. In some examples, the mobile device 102 further displays indicators in addition to the user-interactive track 502 to facilitate the interaction between the track 502 and the user. In some examples, the indicators are colors, shapes, sizes, and/or animations of visual elements that are displayed on the touchscreen 110.

For example, the color of a background of the application, the user-interactive track 502, or the arrow 506 may be gray when the touchscreen 110 detects that no user input is being provided. In another example, the color of the background of the application, the user-interactive track 502, or the arrow 506 may be orange when the mobile device 102 detects that the user's movement along the track 502 does not satisfy the certain threshold speed. In another example, the color may be green when the user's movement along the track 502 is satisfactory. In another example, the button 504 may be moving steadily around the user-interactive track 502 when there is no contact between the button 504 and the user. In some examples, the indicators are texts displayed on the touchscreen 110 instructing the user as to how the user should interact with the user-interactive track 502.

In some examples, the mobile device 102 provides training modes for using the RePA feature based on the experience level of the user. For example, the mobile device 102 may determine that the user is a first time user of the RePA feature when the mobile device 102 executes the RePA application on the mobile device 102 for the first time. In such example, the mobile device 102 operates the RePA application in a first training mode. In the first training mode, a tutorial is provided once the RePA application is initiated. The tutorial may include animation or video to instruct the user as to how the RePA feature should be used. In the first training mode, the indicators are displayed on the touchscreen 110 to assist the user. When the mobile device 102 determines that the user is not a first-time user of the RePA application or the application is not being executed for the first time, the RePA application operates the RePA application in a second training mode. In the second training mode, the instructions and/or visual cues for aiding the user are fewer compared to the first training mode. For example, the indicators may be partially displayed. In some examples, the second training mode provides a user-configurable default settings for experienced users of the RePA system.

Returning to FIG. 1, the vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 is a semi-autonomous vehicle (e.g., some routine motive functions, such as parking, are controlled by the vehicle 100), or an autonomous vehicle (e.g., motive functions are controlled by the vehicle 100 without direct driver input). In the illustrated example, the vehicle 100 includes range detection sensors 108, an on-board communication platform 106, and an electronic control unit (ECU) 104.

The range detection sensors 108 may be ultrasonic sensors, radar, LiDAR, cameras, etc. In some examples, the range detection sensors 108 are installed on the outer edge surfaces of the vehicle 100. The range detection sensors 108 detect elements within a predetermined distance from the vehicle 100. In some examples, a sensing range of the range detection sensors 108 covers one or more areas around the vehicle 100. In some examples, the sensing range of the range detection covers all of the areas located in 360 degrees around the vehicle 100. The range detection sensors 108 are electronically connected to the ECU 104 to transmit sensing signals.

The on-board communication platform 106 communicatively couples to the mobile device 102 and the vehicle 100. Additionally, the on-board communication platform 106 manages communication between the ECU 104 and the mobile device 102. The on-board communication platform 106 receives the sensory data from the ECU 104 and transmits the same or a subset thereof to the mobile device 102. Further, the on-board communication platform 106 receives the user-selected parking data from the mobile device 102 and transmits the user-selected parking data to the ECU 104. The on-board communication platform 106 also includes hardware (e.g., processors, memory, storage, antenna, etc.) and software to control wireless network interfaces. The on-board communications platform 106 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Bluetooth® or Bluetooth® Low Energy (BLE); local area wireless network (including IEEE 802.11 a/b/g/n/ac or others), dedicated short range communication (DSRC), and Wireless Gigabit (IEEE 802.11ad), etc.) to directly (via a personal area network connection or a wireless area network connection) or indirectly (e.g., via a cellular connection) communicatively couple to the mobile device 102.

The ECU 104 is communicatively coupled to the range detection sensors 108 and the on-board communication platform 106. The ECU 104 comprises a RePA system 114 for performing the RePA operations. The ECU 104 receives the sensing signal from the range detection sensors 108 and calculates a distance between each of the range detection sensors 108 and its detected element based on the sensing signal. Based on the calculation, the ECU 104 forms a virtual map of the detected elements and generates the environment information. The ECU 104 uses the environment information and vehicle information to generate the sensory data and transmit the sensory data to the mobile device 102 via the on-board communication platform 106. The ECU 104 further receives the user-selected parking data via the on-board communication platform 106. The ECU 104 extracts information regarding the desired parking space and the outline 402 from the user-selected parking data. Based on the extracted information, the ECU 104 performs an autonomous parking maneuver. Specifically, the ECU 104 includes the RePA system 114 that, when engaged, performs autonomous parking maneuvers when a valid parking spot is detected and messages indicative of continuous user input are received from the mobile device 102.

Figure 6A:
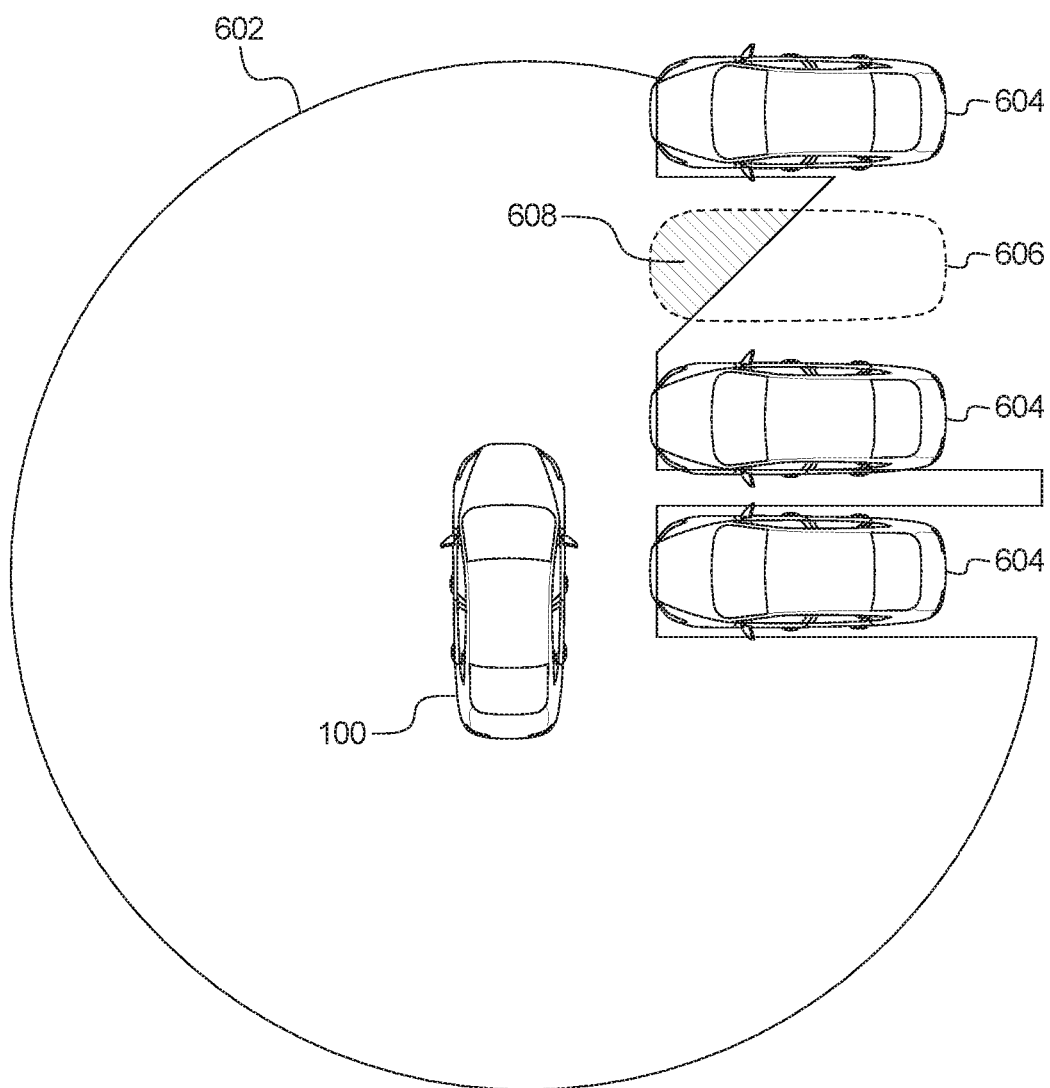
FIG. 6A, 6B, 6C, and 6D illustrate the vehicle of FIG. 1 in a certain scenario and the mobile device of FIG. 1 displaying an interface based on the scenario.
Figure 6D:
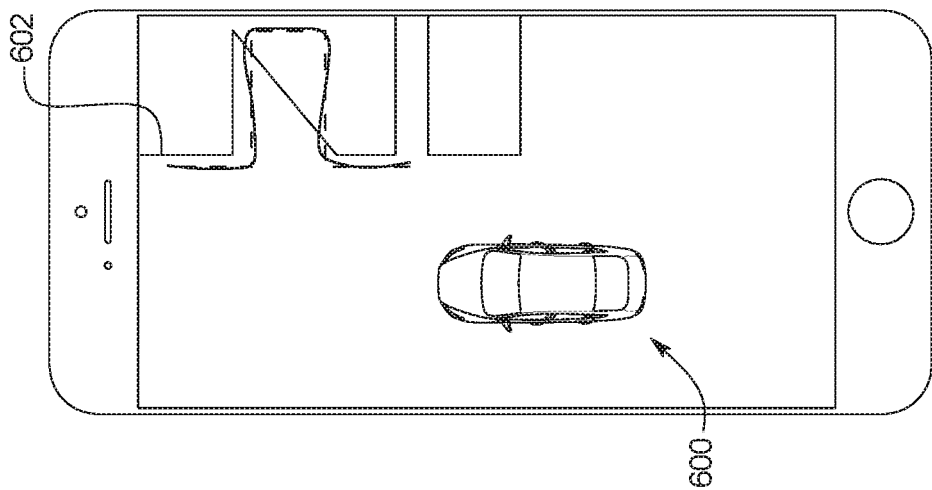
Figure 6C:
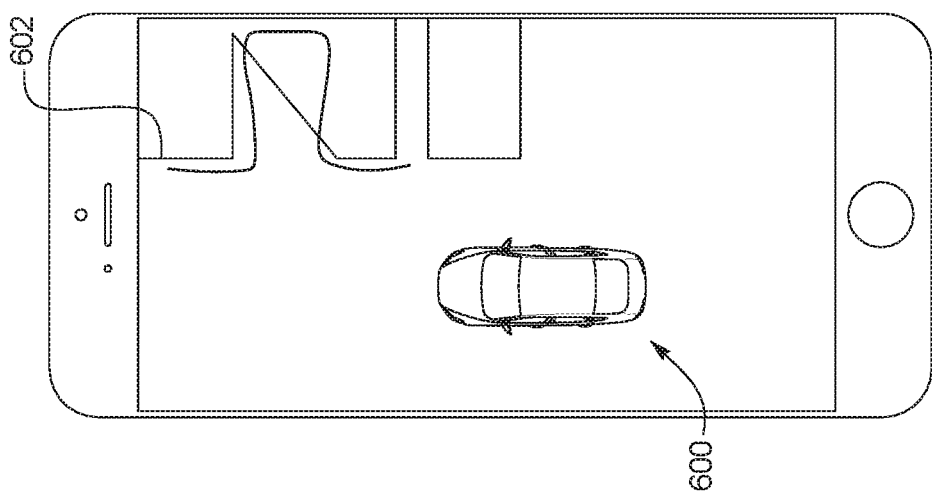
Figure 6B:
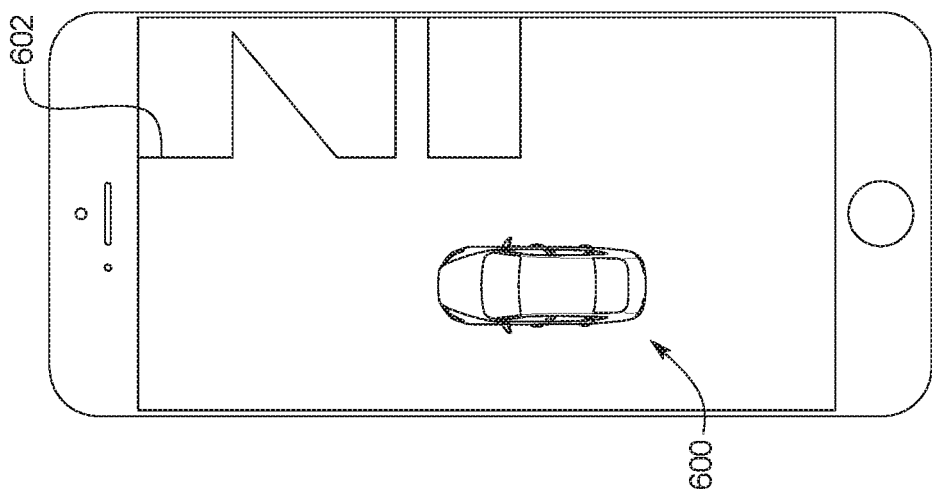

As an example, referring to FIG. 6A, the vehicle 100 may be in a scenario where the RePA system 114 cannot detected whether a parking space exists in a proximity of the vehicle 100. In this illustrated example, the vehicle 100 detects obstacles within a sensing range 602 covering an area that is 360 degrees around the vehicle 100. In such examples, the range detection sensors 108 covering these areas detect up to a predetermined distance. In the illustrated examples, multiple vehicles 604 are located in the vicinity of the vehicle 100. Additionally, a parking space 606 is exists between the two vehicles 604. The vehicle 100, however, is positioned with respect to the vehicles 604 such that the range detection sensors 108 of the vehicle 100 cannot detect a portion 608 of the parking space 606. In such examples, the RePA system 114, when activated: (1) detects, via the range detection sensors 108, the area within the sensing range 602 based on the current position/orientation of the vehicle 100; (2) generates the sensory data based on the detection; and (3) transmits the sensory data to the mobile device 102 of the user. As illustrated in FIG. 6B, the mobile device 102 receives the sensory data and displays a virtual representation 600 of the vehicle 100 and the surrounding area. The virtual representation 600 provides context 602 as to where the parking space may be located. For example, the context may be based on a curvature of boundaries of obstacles as defined in the environment information. In the examples illustrated in FIGS. 6C and 6D, the context 602 facilitates user input of the desired parking space and the outline 402. Information regarding the outline 402 enables the RePA system 114 to estimate the boundary of the obstacles around the desired parking space even when the boundary of the obstacles around the desired parking space is undetectable by the range detection sensors 108. In some examples, the RePA system, based on current measurements from the range detection sensors 108, cannot determine whether the parking space indicated by the user is actually suitable for the vehicle 100. For example, the RePA system 114 may determine that at least some of the indicated parking space is available, but may not be able to determine the entire dimensions of the space. In such examples, the ECU 104 calculates a path to an intermediate position near the desired parking space such that the range detection sensors 108 can detect the dimensions of the desired parking space at the intermediate position. When receiving messages from the mobile device 102 indicative of continuous input from the user, the ECU 104 autonomously moves to the intermediate position. This process may be repeated until the vehicle 100 is positioned at a location in which the RePA system 114 is able to determine whether the desired parking position is valid or invalid. In some examples, the intermediate position is not at a point on a direct path from the vehicle 100 to the desired parking space. In such examples, the intermediate position may be a position and/or an orientation of the vehicle 100 that enables the RePA system 114 to better detect the desired parking space. When, either initially or after moving to an intermediate position, the RePA system 114 determines that the desired parking space is invalid, the RePA system 114 provides an alert to the mobile device 102. In some examples, the RePA system 114 further determines, based on the current position, whether a new parking space can be found based on the measurements from the range detection sensors 108. If a new parking space is detected, the RePA system 114 instructs the mobile device 102 to prompt the user as to whether the user accepts the new parking space. Based on the user's decision, the RePA system 114 calculates a path for the vehicle 100 to autonomously move to the new parking space. When, either initially or after moving to an intermediate position, the RePA system 114 determines that the desired parking space is valid, the RePA system 114 calculates a path into the parking space to be traversed when the continuous input signal is received from the mobile device 102.

Figure 7:
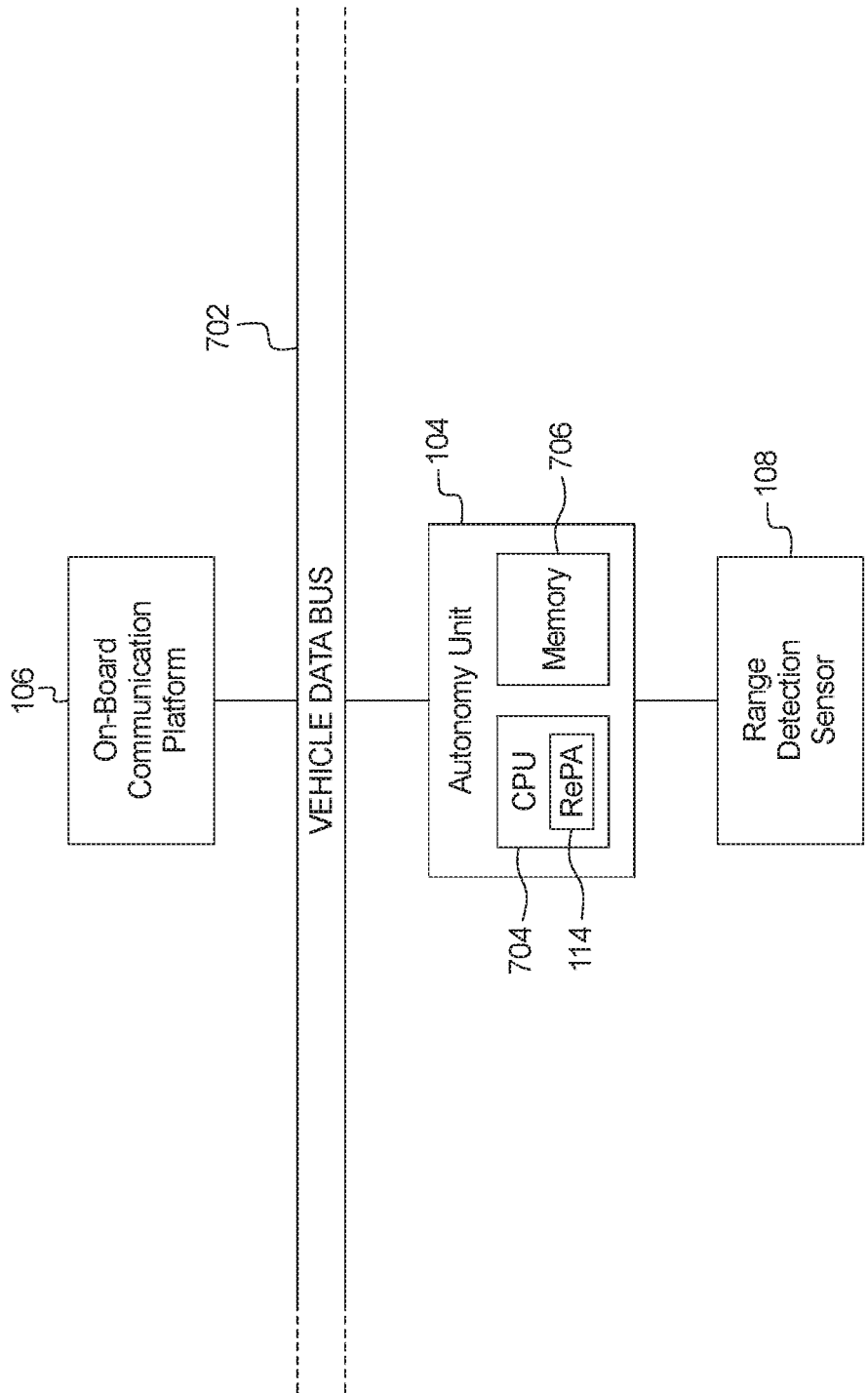
FIG. 7 is a block diagram of electronic components of the vehicle of FIG. 1.

FIG. 7 is a block diagram of electronic components of the vehicle 100 of FIG. 1. In the illustrate example, the electronic components include the ECU 104, the range detection sensors 108, the on-board communication platform 106, and a vehicle data bus 702.

In the illustrated example, the ECU 104 includes a processor or controller 704 and memory 706. In the illustrated example, the ECU 104 is structured to include the RePA system 114. The processor or controller 704 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 706 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory 706 includes multiple kinds of memory, particularly volatile memory and non-volatile memory.

The memory 706 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory, the computer readable medium, and/or within the processor 704 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 702 communicatively couples the on-board communication platform 106 and the ECU 104. In some examples, the vehicle data bus 702 includes one or more data buses. The vehicle data bus 702 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 8:
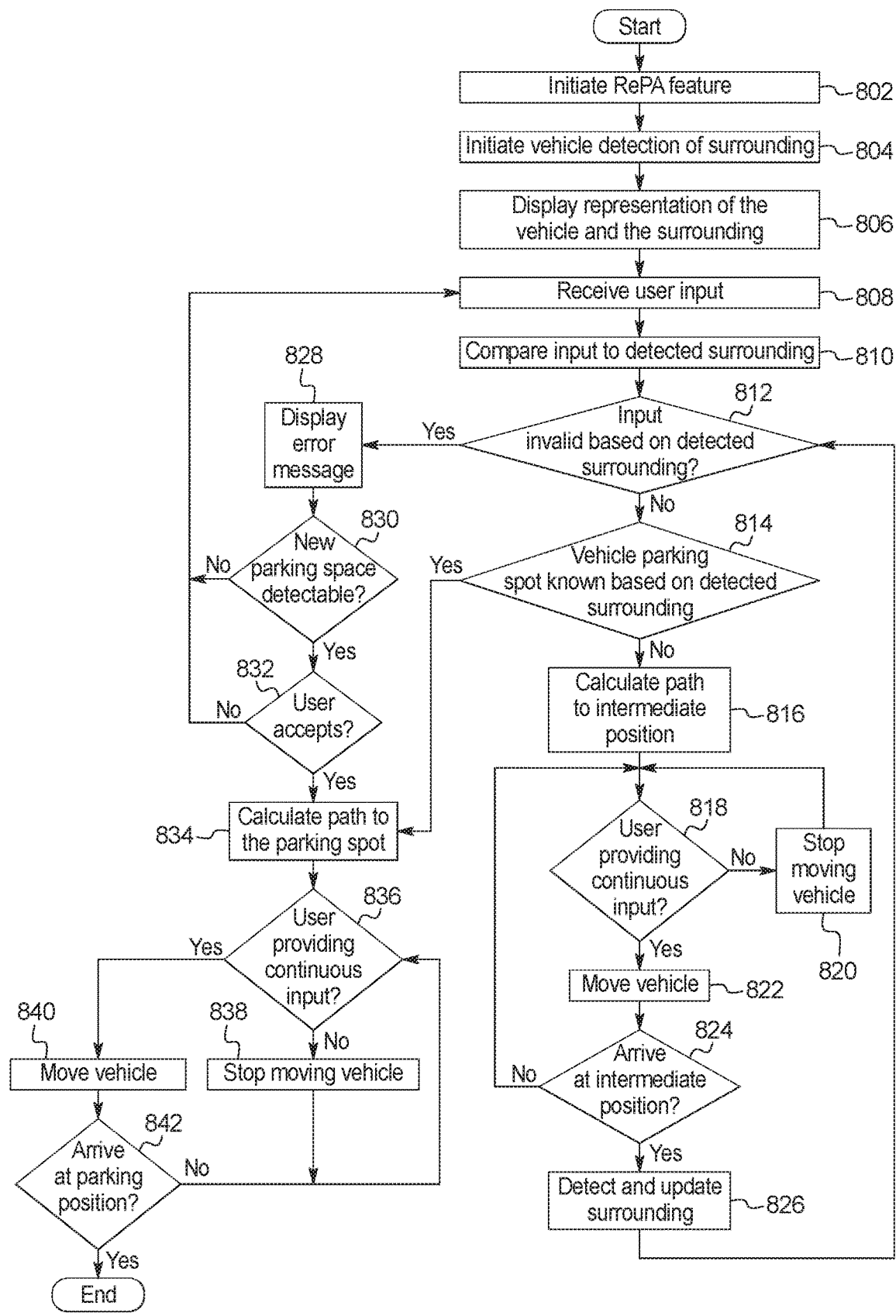
FIG. 8 is a flowchart of a method to assist an operator operating the remote park assist system of the vehicle of FIG. 1, which may be implemented by the electronic components of FIG. 7.

FIG. 8 is a flowchart of a method of operating the remote park assist system of the vehicle 100 of FIG. 1, which may be implemented by the electronic components of FIG. 7.

At block 802, the user initiates the RePA system. In some examples, the RePA system 114 is initiated by the mobile device 102. In some examples, the RePA system 114 is initiated via an infotainment unit (not shown) included in the vehicle 100.

At block 804, the range detection sensors 108 detects the surrounding area of the vehicle 100. The RePA system 114 calculates a distance between the vehicle 100 and the detected obstacles based on the measurements of the range detection sensors 108. Based on the calculation, the RePA system 114 forms a virtual map of the detected elements and generates the environment information. The RePA system 114 uses the environment information and vehicle information to generate the sensory data and transmits the same to mobile device 102.

At block 806, the mobile device 102 receives sensory data from the vehicle 100. The sensory data includes vehicle information and environment information. Based on the vehicle information and the environment information, the mobile device 102 displays virtual representations of the vehicle 100 and the area surrounding the vehicle 100. The virtual representations of the vehicle 100 and the surrounding area are displayed such that dimensions of the virtual representations of the vehicle 100 and the surrounding area are scaled according to the actual dimensions of the vehicle 100 and the surrounding area. An example interface used to display the virtual representations of the vehicle 100 and the area surrounding the vehicle 100 are described in connection with FIGS. 6B, 6C, and 6D above.

At block 808, the user provides the user-selected parking data via the mobile device 102. In some examples, the user provides a user input via the touchscreen 110 to select and drag the virtual representation of the vehicle 100 to the desired parking space (as illustrated in FIG. FIGS. 2A, 2B, and 2C above). In alternatively examples, a virtual parking space 302 may be displayed on the display device in addition to the virtual representation of the vehicle 100. The user may provide the user input via the touchscreen 110 to select and drag the virtual parking space 302 to the desired parking space (as illustrated in FIGS. 3A, 3B, and 3C above). In some examples, the user further provides an input to sketch an outline 402 defining a slot (as illustrated in FIGS. 4A, 4B, and 4C above). The mobile device 102 generates the user-selected parking data based on the desired parking space and the outline 402 and transmits the same to the vehicle 100.

At block 810, the RePA system 114 receives the user-selected parking data from the mobile device 102. The RePA system 114 extracts information regarding the desired parking space and the outline 402 from the user-selected parking data. The RePA system 114 compares the information regarding the desired parking space and the outline 402 with the sensory data.

As block 812, the RePA system 114 determines whether the desired parking space is invalid based on a comparison between the desired parking space and the area detected by the range detection sensors 108 of the vehicle 100. An invalid parking space indicates that the vehicle 100 cannot be physically be parked in desired parking space. For example, the desired parking space may overlap at least one obstacle within the area detected by the range detection sensors 108. When the RePA system 114 determines that the desired parking space invalid, the method continues to block 828. When the RePA system 114 determines that the desired parking space is valid, or when the RePA system 114 is unable to determine whether the desired parking space is valid or invalid, the block continues to block 814.

At block 814, the RePA system 114 determines whether the desired parking space is valid. A valid parking space indicates that the vehicle 100 can be parked in desired parking space. When the desired parking space is valid, the method continues to block 834. When the desired parking space is unknown, the method continues to block 816.

At block 816, the RePA system 114 calculates a path to an intermediate positon between the vehicle 100 and the user-selected parking space.

At block 818, the RePA system 114 determines whether message indicative of the user providing continuous input are received from the mobile device 102. When the RePA system 114 determines that the message is being received, the method continues to block 822. When the RePA system 114 determines that the message is not being received, the method continues to block 820.

At block 820, the RePA system 114 stops the autonomous motion of the vehicle 100.

At block 822, the RePA system 114 the autonomously moves the vehicle 100 along the calculated path.

At block 824, the RePA system 114 determines whether the vehicle 100 has arrived at the intermediate position. When the vehicle 100 has arrived at the intermediate position, the method continues to block 826. When the vehicle 100 has yet to arrive at the intermediate position, the method returns to block 818.

At block 826, the RePA system 114 uses the range detection sensors 108 to detect the surrounding area of the vehicle 100 at the intermediate position.

At block 828, after determining that the user-selected parking space is invalid, the RePA system 114 instructs the mobile device 102 to display an error message to the user.

At block 830, the RePA system 114 determines whether a new parking space can be detected in the current position of the vehicle 100 based on the measurements from the range detection sensors 108. When a new parking space is detectable in the current position of the vehicle 100, the method continues to block 832. When a new parking space undetectable in the current position of the vehicle 100, the method returns to block 808.

At block 832, the RePA system 114 instructs the mobile device 102 prompt the user as to whether the user accepts the new parking space as the desired parking space. When the user accepts the new parking space, the method continues to block 834. When the user rejects the new parking space, the method returns to block 808.

At block 834, the RePA system 114 calculates a path to the desired parking space.

At block 836, the RePA system 114 determines whether the message indicative of continuous user input is received from the mobile device 102. When the RePA system 114 detects that the message is being received, the method continues to block 840. When the RePA system 114 detects that the message is not being received, the method continues to step block 838.

At block 838, the RePA system 114 stops the autonomous motion of the vehicle 100.

At block 840, the RePA system 114 autonomously moves the vehicle 100 along the calculated path.

At block 842, the RePA system 114 determines whether the vehicle 100 has arrived at the desired parking position. When the vehicle 100 has arrived at the desired parking position, the method ends. When the vehicle 100 has not arrived at the desired parking position, the method returns to step 836.

The flowchart of FIG. 8 is representative of machine readable instructions stored in memory (such as the memory 706 of FIG. 7) that comprise one or more programs that, when executed by a processor (such as the processor 704 of FIG. 7), cause the vehicle 100 to implement the example RePA system 114 and/or, more generally, the example RePA system 114 of FIGS. 1 and 7. Further, although the example program(s) is/are described with reference to the flowchart illustrated in FIG. 8, many other methods of implementing the example RePA system 114 and/or, more generally, the example RePA system 114 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle system, comprising:
   a mobile device comprising a touchscreen, the mobile device to:
   automatically operate in a first training mode when the mobile device determines that a user is using a remote park assist (RePA) application for the first time;
   operate in a second training mode when the mobile device determines that the user is not using the RePA application for the first time;
   provide a display for receiving a user input, the display comprising an indicator to guide a user for providing the user input, the indicator being responsive to the first training mode and the second training mode; and
   transmit a message in response to the user input; and
   a vehicle to autonomously traverse a calculated parking path while the message is being received.

2. The vehicle system of claim 1, wherein the second training mode provides at least one user-configurable default setting.

* * * * *